Figure 1:
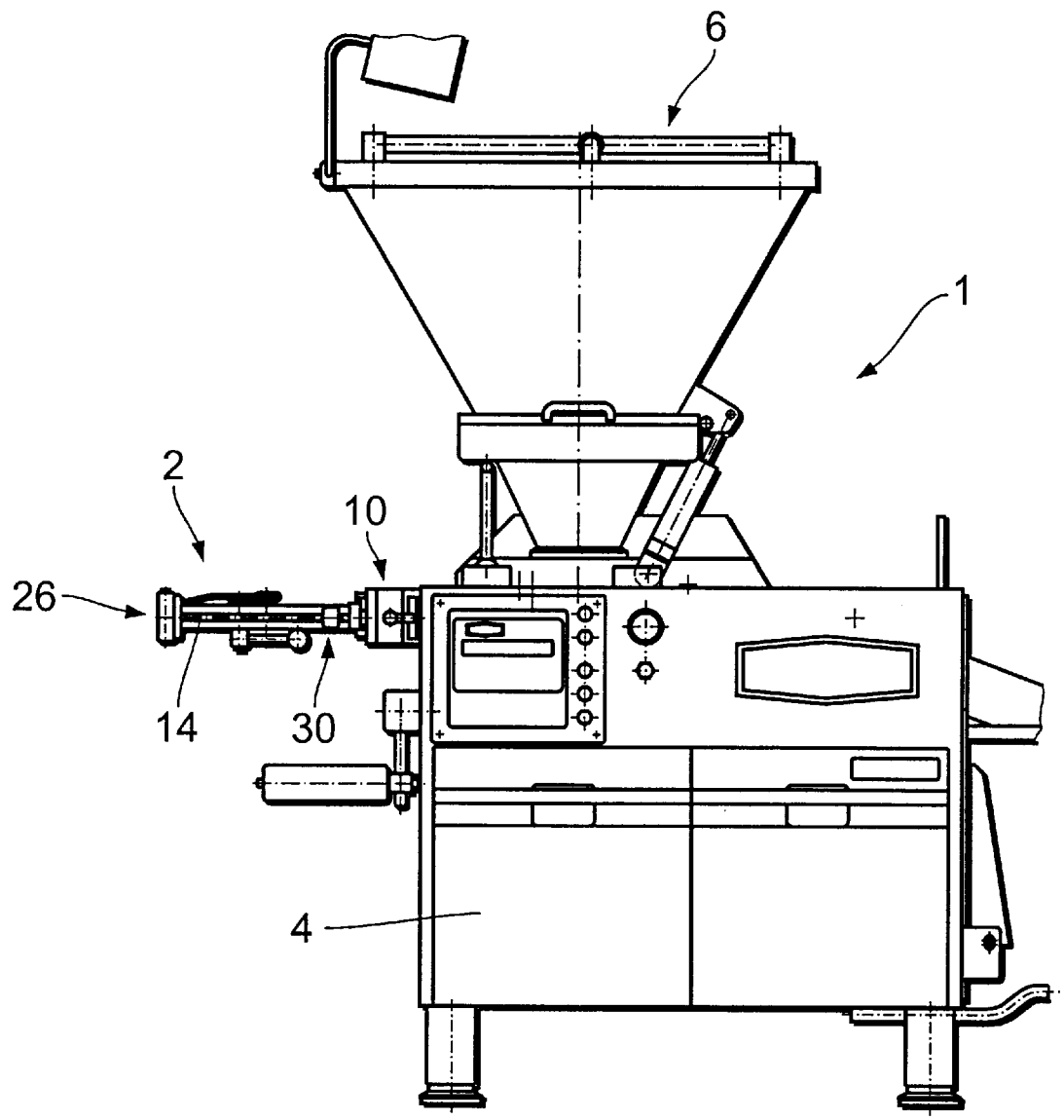

United States Patent [19]
Hiller et al.

[11] Patent Number: 6,132,302
[45] Date of Patent: Oct. 17, 2000

[54] DEVICE FOR FILLING CASINGS AS WELL AS MACHINE FOR FILLING SAUSAGE CASINGS

[75] Inventors: Klaus Hiller, Dorverden; Oliver Zerbst, Verden/Walle, both of Germany

[73] Assignee: Vemag Maschinen -und Anlagenbau GmbH, Verden/Aller, Germany

[21] Appl. No.: 09/168,496

[22] Filed: Oct. 8, 1998

[30] Foreign Application Priority Data

Oct. 22, 1997 [DE] Germany ................ 297 18 684 U

[51] Int. Cl.[7] .................................................. A22C 11/10
[52] U.S. Cl. ........................... 452/45; 452/35; 452/47
[58] Field of Search .................... 452/45, 31, 35, 452/22, 47

[56] References Cited

U.S. PATENT DOCUMENTS

| | | | |
|---|---|---|---|
| 1,366,183 | 1/1921 | Hottmann . | |
| 2,863,167 | 12/1958 | Nordin . | |
| 4,563,792 | 1/1986 | Niedecker | 452/31 |
| 4,570,300 | 2/1986 | Nausedas | 452/31 |
| 4,570,301 | 2/1986 | Beckman et al. | 452/35 |
| 4,602,402 | 7/1986 | Schnell | 452/31 |
| 4,734,956 | 4/1988 | Frey et al. | 452/35 |
| 4,766,645 | 8/1988 | Lamartino et al. | 452/31 |
| 5,512,012 | 4/1996 | Lendle et al. . | |

FOREIGN PATENT DOCUMENTS

| | | |
|---|---|---|
| 0 121 761 | 10/1984 | European Pat. Off. . |
| 0 568 372 | 11/1993 | European Pat. Off. . |
| 87 04 705 | 7/1987 | Germany . |
| 92 11 979 | 12/1992 | Germany . |
| 29 51 733 | 10/1995 | Germany . |
| 295 17 333 U | 4/1997 | Germany . |

*Primary Examiner*—Willis Little
*Attorney, Agent, or Firm*—Altera Law Group LLC

[57] ABSTRACT

The invention concerns a device for filling casings for a machine for filling sausage casings, with a filling pipe (14) driveable and rotatable around its longitudinal axis (12), onto which pipe a casing (8) fillable through the filling pipe (14) is pulled, and a casing take-along apparatus (30) that is rotatable simultaneously with the filling pipe (14) for rotating the casing (8). According to the invention, the casing take-along apparatus (30) is arranged so as to be axially movable relative to the filling pipe (14) and, for transmitting a torque, is coupled to the filling pipe (14) in an essentially interlocking manner.

21 Claims, 8 Drawing Sheets

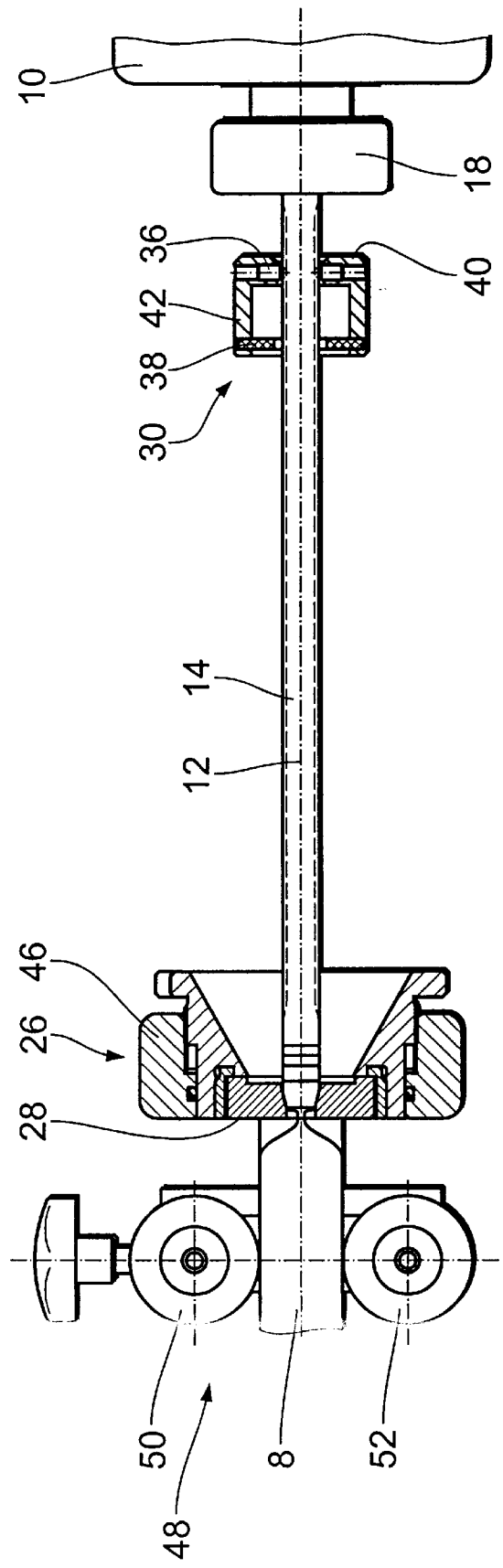
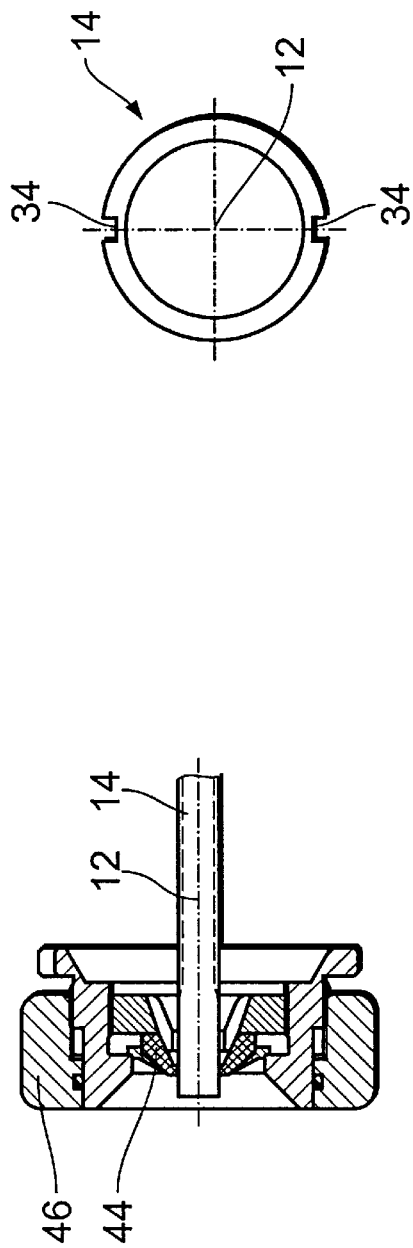
Fig. 4
Fig. 5
Fig. 6

DEVICE FOR FILLING CASINGS AS WELL AS MACHINE FOR FILLING SAUSAGE CASINGS

The present invention concerns a device for filling casings for a machine for filling sausage casings, with a filling pipe that is rotatable and driveable around its longitudinal axis, onto which pipe a casing fillable through the filling pipe can be drawn up, and with a casing take-along apparatus, rotatable simultaneously with the filling tube, for turning the casing.

The invention further concerns a machine for filling sausage casings, with a supply container for sausage meat, with a conveyer device connected to the supply container for conveying the sausage meat, and with a device for filling casings, which device shows a filling pipe that is rotatable and driveable around its longitudinal axis, onto which pipe a casing fillable through the filling pipe can be drawn up, and a casing take-along apparatus, rotatable simultaneously with the filling pipe, for turning the casing.

Devices of this sort for filling casings as well as filling machines of this sort are known. The device for filling casings is part of a filling machine, with the aid of which casing of artificial material (artificial casing) or natural casing can be filled with sausage meat and "twisted off" in such a manner that separable, filled segments of, to the greatest possible degree, equal length and weight are formed, which segments can be separated from each other in order to form individual small sausages.

Before the filling of the casing, the latter is drawn up onto the filling pipe in a gathered-up (caterpillar-like) state. During its filling with sausage meat through the filling pipe with the aid of the conveyer device in the form of a pump, the casing is drawn down at one end of its gathered-up section by means of the sausage meat's pushing into the casing with pressure. When an adjustable amount of sausage meat has been filled into the casing, for the twisting off of the casing the filling pipe, supported so as to be rotatable around its longitudinal axis, is turned by means of a drive. Simultaneously, the casing that is gathered up and drawn up onto the filling pipe is also turned, while the casing in the region of the free end of the filling pipe, out of which end the sausage meat can be pushed, is held stationary by means of a so-called casing brake, and in this way a turning along with the casing drawn up onto the filling pipe is prevented. In this manner the casing is twisted off at a constriction or twist-off point. After the twisting off, the turning of the filling pipe is interrupted and a mass of sausage meat is again filled into the casing through the filling pipe, accompanied by a pulling off of the casing. Thereafter the twisting-off process is again started. In this way individual, portioned sausages can be produced.

The casing take-along apparatus serves, during the twisting off, to take along the casing drawn up onto the filling pipe, i.e. to rotate the casing together with the filling pipe. In a device for filling casings known from the registered design DE-U-92 11 979.4, the casing take-along apparatus is designed in the form of a clamp or a clip, which clamps firmly to the filling pipe, through a frictional connection, the casing that has been pushed onto the filling pipe and ungathered. Through the firm clamping by means of the clip, the casing pushed onto the filling pipe is rotated together with the filling pipe during the twisting-off phase. The connection between casing and filling pipe is, however, disadvantageous in operation, as practice has shown, since a great slippage between casing and filling pipe can occur during the rotating, so that the twisting off of the casing at the twisting-off point is insufficient or the twisting-off time would be lengthened. In particular, by reason of thickness changes of the casing over its length, uneven frictional forces between clip, casing, and filling pipe can arise, which cause an uneven taking-along of the casing.

The take-along apparatus in the form of a clip has the further disadvantage that during operation and the accompanying pulling off of the casing, the clip must be manually pushed in the direction of the free end of the filling pipe. Only in this way can a complete utilization of the drawn-up casing be achieved. If the casing is not manually shifted, as frequently happens in operation, then the casing is used up only incompletely, so that there remains a remnant of casing that cannot be filled. This leads to an unnecessary waste. If the manual shifting of the casing is left undone, a bursting of the casing often results, since the latter winds around the filling pipe. Finally, it has become evident that the clip, which is formed as a C-shaped ring so that it can be placed upon the filling pipe, is thrown from the filling pipe during operation. From this results a considerable risk of injury, and the operation must be interrupted in order to pull on a new casing and to remove impurities.

In a casing take-along apparatus, known from the registered design DE-U-29 51 733.5, a cylindrical pipe is rigidly connected to the filling pipe at a rear end of the filling pipe, which lies opposite the casing outlet opening, by means of a cylinder piece. The pipe thus connected rigidly to the filling pipe and arranged coaxially to it transmits the rotational movement of the filling pipe inflexibly to an elastic take-along ring, which presses the casing towards the filling pipe in the region of the front end of the latter, in order to rotate the casing in unison with the filling pipe. This take-along apparatus has the disadvantage that the external pipe extends over a great length of the filling pipe from the front end to the rear end and therefore has a large mass and great inertia, which counteracts an acceleration or retardation of the filling pipe. Moreover, the rigid connection of the pipe to the filling pipe is relatively expensive. An axial motion of the take-along ring relative to the filling pipe is excluded. In the intermediate space between the outer surface of the filling pipe and the inner surface of the external pipe a great mass of sausage meat collects in the event of a bursting of the casing, which mass must be removed at some expense. Further, the external pipe has a large diameter. By reason of the large mass of the external pipe, imbalances arise, which can lead to vibrations, which in turn cause great stresses on the bearings. In sum, this known take-along apparatus is structurally complex and expensive.

The task upon which the present invention is based is to avoid the disadvantages of the prior art and to make available a device for filling casings as well as a machine for filling sausage casings that make possible, in a structural simple and reliable manner, a largely complete ungathering of the casing.

According to the invention, this task is accomplished with respect to a casing-filling device as well as a casing-filling machine of the type named in the introduction by the fact that the casing take-along apparatus is arranged so as to be axially movable relative to the filling pipe and, for the transmission of a torque, is coupled to the filling pipe in an essentially interlocking manner.

The invention is distinguished by the fact that the casing take-along apparatus is axially movable for the rotation of the casing and, at the same time, is coupled to the filling pipe in an interlocking manner, in order that a torque may be transferred from the filling pipe to the casing take-along apparatus, and from the latter to the casing. By this means, a secure, slip-free rotation of the casing with the aid of the casing take-along apparatus is possible. Through the axial movement, the casing take-along apparatus can "wander" along the filling pipe during the filling and the twisting off of a sausage casing. For example, if, at the beginning of the filling of the casing, the casing take-along apparatus is arranged at the rear end of the filling pipe, away from the outlet opening for the sausage meat, and during the filling of the casing moves slowly in the direction of the front end of the filling pipe, which end shows the outlet opening for the sausage meat, this is readily possible by virtue of the axially movable arrangement of the casing take-along apparatus. If the casing is largely used up, the casing take-along apparatus is arranged in the region of the front end of the filling pipe. The casing take-along apparatus according to the invention makes possible a complete utilization of the drawn-up casing without leaving a substantial part of the casing unfilled and thus unused.

Through the rotationally-fixed coupling of the casing take-along apparatus to the filling pipe and the simultaneous fixing of the casing to the casing take-along apparatus, the casing is rotated together with the filling pipe without requiring a separate casing-driving apparatus, as is required in connection with the devices for filling casings in the prior art. The invention ensures a secure and uniform taking along of the casing during the twisting off.

An especially preferred implementation for of the invention is characterized by the fact that the casing take-along apparatus shows at least one projection and the filling pipe shows exteriorly at least one axially-running groove, in order to produce the interlocking and at the same time axially-movable connection between the take-along ring and the filling pipe. By means of the projection and the axially-running groove on the filling pipe, an interlocking, rotationally-fixed connection for transmitting a torque from the filling pipe to the casing take-along apparatus is realized in a structurally simple manner. Alternatively, a projection could be formed on the filling pipe and an axially-running groove on the casing take-along apparatus. The axially-running groove, for which provision is made on the exterior region of the filling pipe, extends essentially along the entire length of the filling pipe. In this way the entire filling pipe can be used for pulling on a gathered-up casing. Before the front end of the filling pipe, which end shows the outlet opening for the sausage meat, the groove can end, so that the casing take-along apparatus has a sort of stop in order to limit the axial movement. In this way an unintentional falling of the casing take-along apparatus from the filling pipe can be prevented.

According to a preferred further development of the invention the casing take-along apparatus is designed essentially as a casing take-along ring arranged coaxially to the filling pipe. This result of this design as a casing take-along ring arranged coaxially to the filling pipe is a configuration that is especially simple and cost-effective with respect to structure. The take-along ring can advantageously consist of a plastic material that has only a small mass but great strength, in order, on the one hand, to ensure a secure taking-along of the casing, and at the same time to be able to withstand the relatively strong centrifugal forces. In this connection, possible imbalances have scarcely any effect. The take-along ring is furthermore easy to produce.

According to a further preferred implementation form of the invention at least one fixing screw can be screwed into the take-along ring, the front section of which screw forms the projection and is partially arranged in the groove formed on the filling pipe. This implementation form likewise ensures a simple, rotationally-fixed connection between the casing take-along ring and the filling pipe. The form of the groove on the filling pipe can here be adapted to the form of the front section of the fixing screw. It is useful if two opposite-lying fixing screws are arranged on the take-along ring, in order to ensure an equalization of centrifugal forces and thus only minimal imbalances.

It is of advantage if the fixing screw is designed as a set screw that is screwable into a bore in the take-along ring, which bore is provided with a thread, and in the screwed-in state does not stand out from the outer contour of the take-along ring. In this way the risk of injury can be minimized. According to a further development of the invention, the fixing screw is secured against an unwanted loosening by means of a counter screw or a self-hardening securing substance, which can be applied inside the boring, in order to further minimize the risk of injury.

A advantageous implementation form of the invention is distinguished by the fact that the casing take-along apparatus shows at least one pressure means for the friction-locked or interlocking fixing of the casing to the casing take-along apparatus. The pressure means provides for a transmitting of the torque from the casing take-along apparatus to the casing, in order to rotate the latter in common with the filling pipe. It is advantageous when the pressure means is designed as an elastically deformable clamp ring, which is preferably attached to the take-along ring. By means of an elastically deformable clamp ring, a secure, essentially friction-locked connection between the casing take-along apparatus, preferably take-along ring, and the casing to be filled can be produced in a simple and quick manner. The clamp ring can, for example, be pressed into the gathered-up casing or pressed against it.

The invention is further developed by having the take-along ring show an essentially radially-extending connecting section for producing the connection to the filling pipe and an essentially axially-extending fixing section for taking up the pressure means for the fixing of the casing. In this manner a simple structure can be realized. According to a further development, the essentially radially-extending connecting section and the pressure means are distanced in such a manner that between the two a section of the gathered-up casing can be arranged. In this way a simple and secure connection of the casing is produced.

In an alternative preferred implementation form of the invention, a groove for accommodating the pressure means is arranged in the essentially axially-extending fixing section, on the inner side that faces the filling pipe in the assembled state. By means of the groove the pressure means is attached to the take-along ring in a structurally simple and reliable manner.

According to a further preferred implementation form, an additional groove is arranged on the inner side, facing the filling pipe, of the fixing section. Into the additional groove can be fastened a fixing element in the form of a so-called casing-holder lip. If such a casing-holder lip is fastened into the second groove, then the device is especially suited for the filling of collagen casing with food matter. In this implementation form it is ensured that gathered-up collagen casing can be completely twisted off and thus completely used up.

In addition, a further development of the invention is distinguished by the fact that the fixing section shows at least one passage bore as a viewing window. By means of the preferably several bores an operator can see through the take-along ring to the gathered-up casing, so that the latter is visible during the portioning. This measure also ensures that the casing is made use of down to the last portion. Beyond that, the casing take-along ring can be well cleansed from the outside through the bores, for example by spraying in the rinsing water from the outside.

In a further implementation form the invention is further developed through a casing brake, arranged in the region of the free end of the open end of the filling pipe, for the purpose of preventing the casing in this region from rotating. In an advantageous manner the casing brake displays a brake ring that works together with the filling pipe. The casing is clamped in between the brake ring and the filling pipe and can be twisted off at a defined twist-off spot. The twist-off spot can, on the one hand, lie "in front of the pipe", i.e. in front of the filling pipe. In this case the brake ring shows a conical constriction segment, which is arranged in front of the front end-section of the filling pipe and provides for a friction-locked braking or holding fast of the casing. On the other hand the brake ring can show an elastic lip section that works together with the outer surface of the filling pipe in such a manner that the casing is held fast between the elastic lip section and the filling pipe in a friction-locked fashion. This configuration is also called twisting-off with exterior brake or twisting-off "upon the pipe".

With the machine according to the invention for filling sausage casings, which machine in an especially preferred manner is designed with a casing take-along apparatus according to the previously-described preferred implementation forms, the same advantages as those resulting from a casing-filling device of the previously-described type can be attained, so that in order to avoid repetition reference is made to the foregoing descriptions. Advantageous further developments and preferred implementation forms are described in the dependent claims and in the following description.

In the following, the invention will be described with the aid of implementation examples, reference being made to the attached figures.

Figure 2:
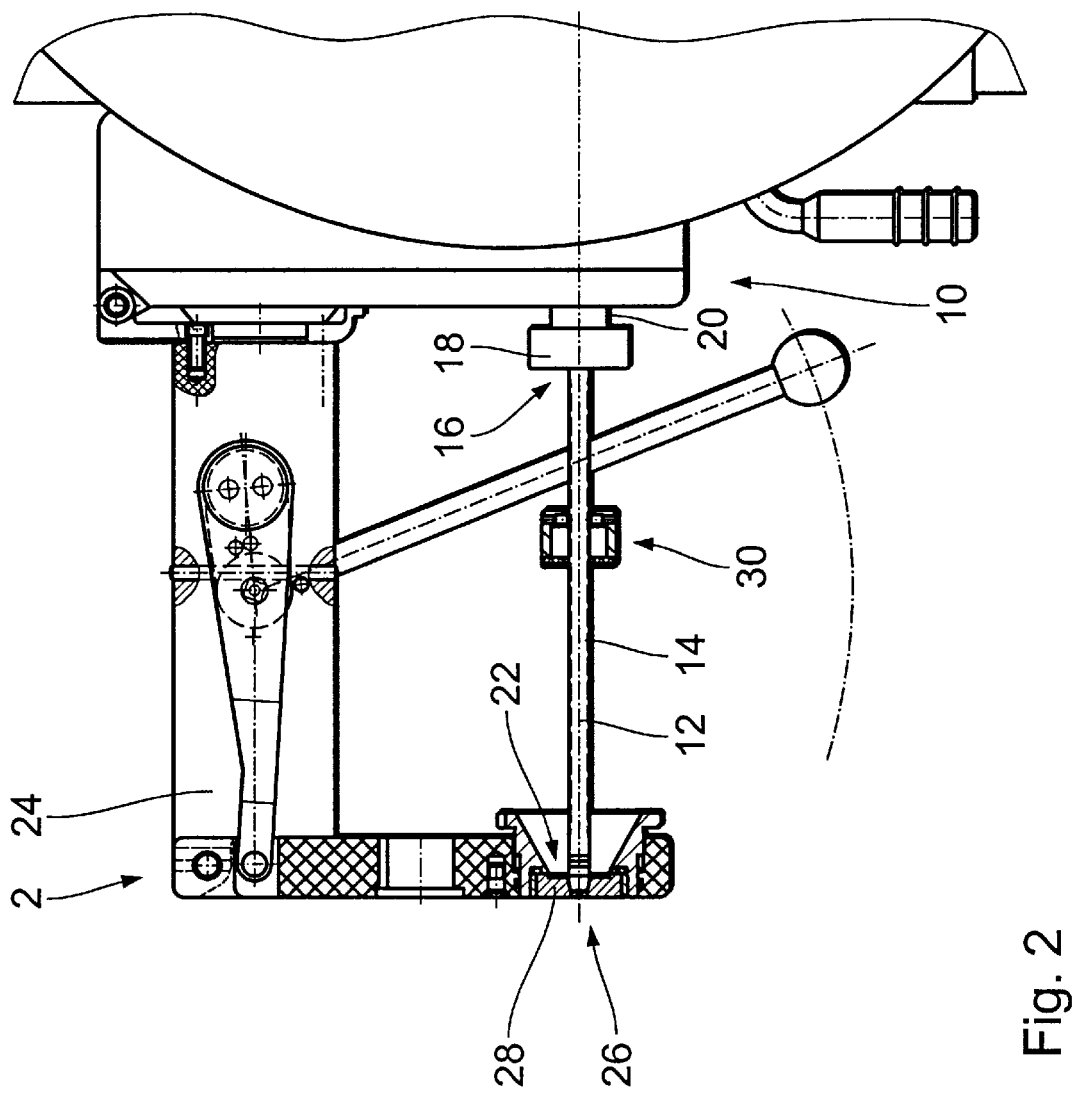
Figure 3:
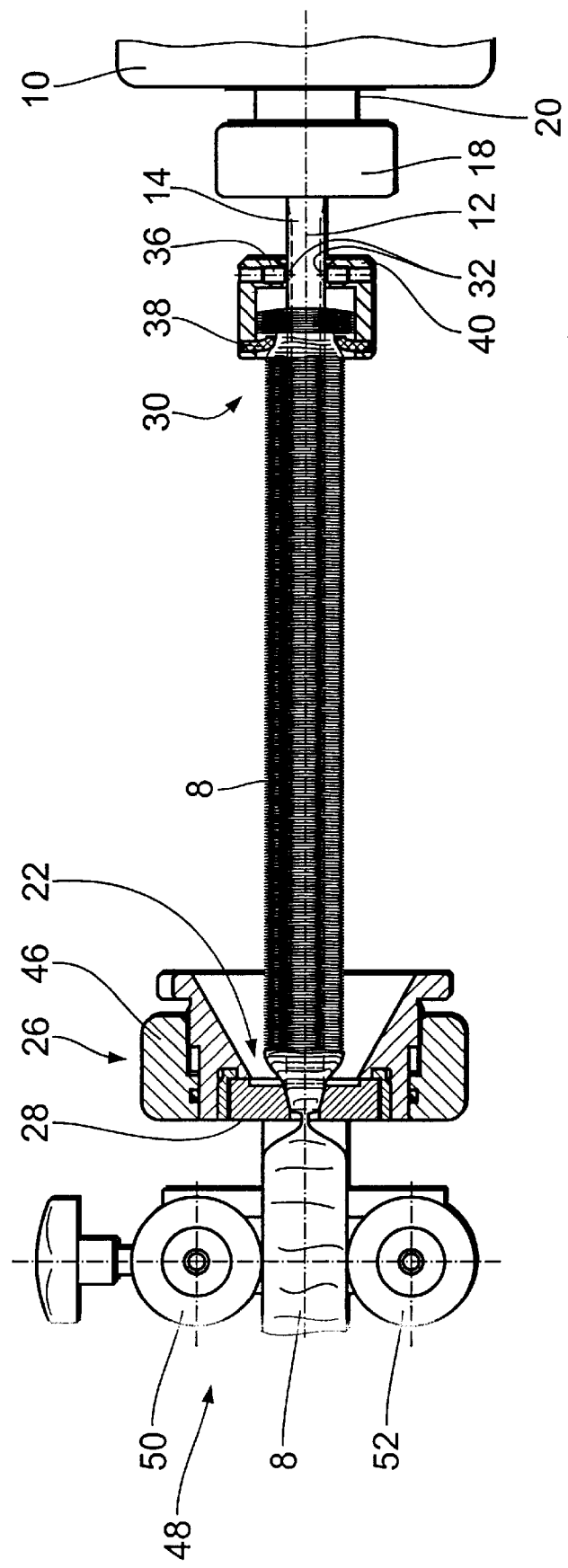
Figure 7:
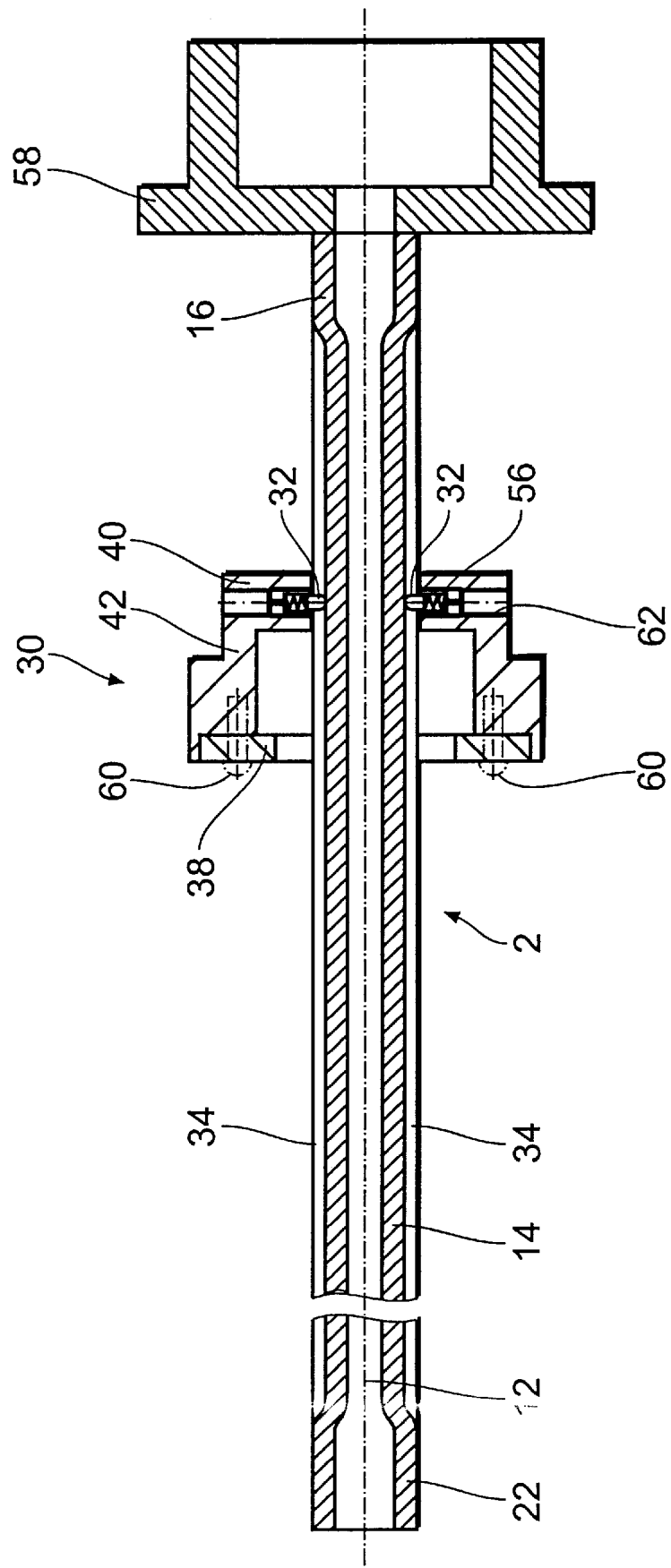
Figure 8:
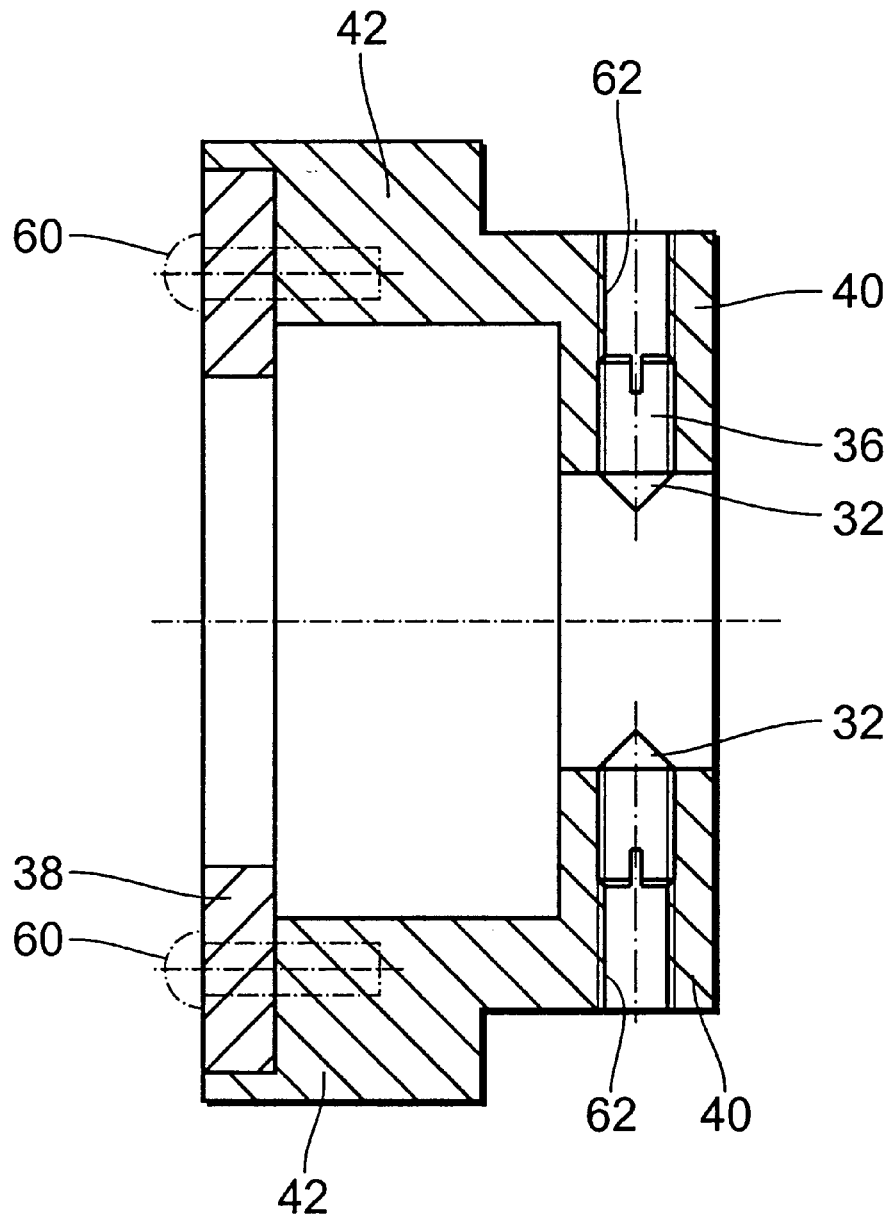
Figure 9:
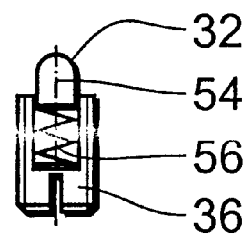
Figure 10:
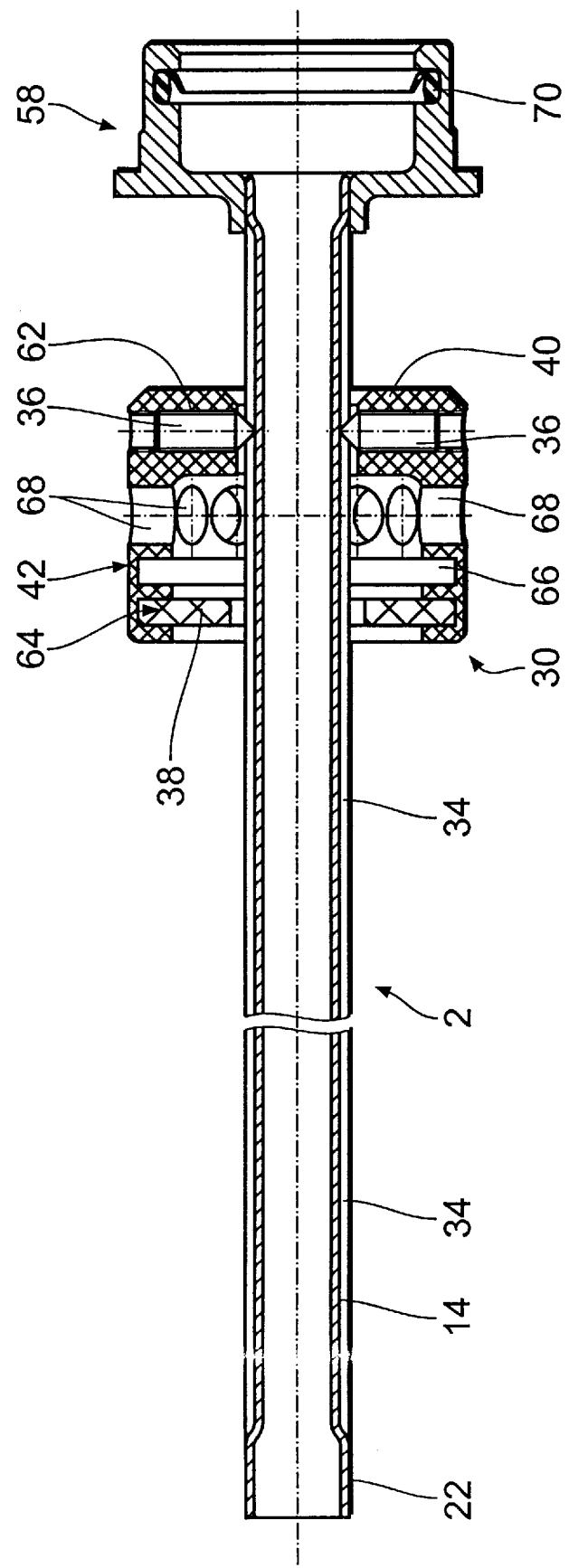
Figure 11:
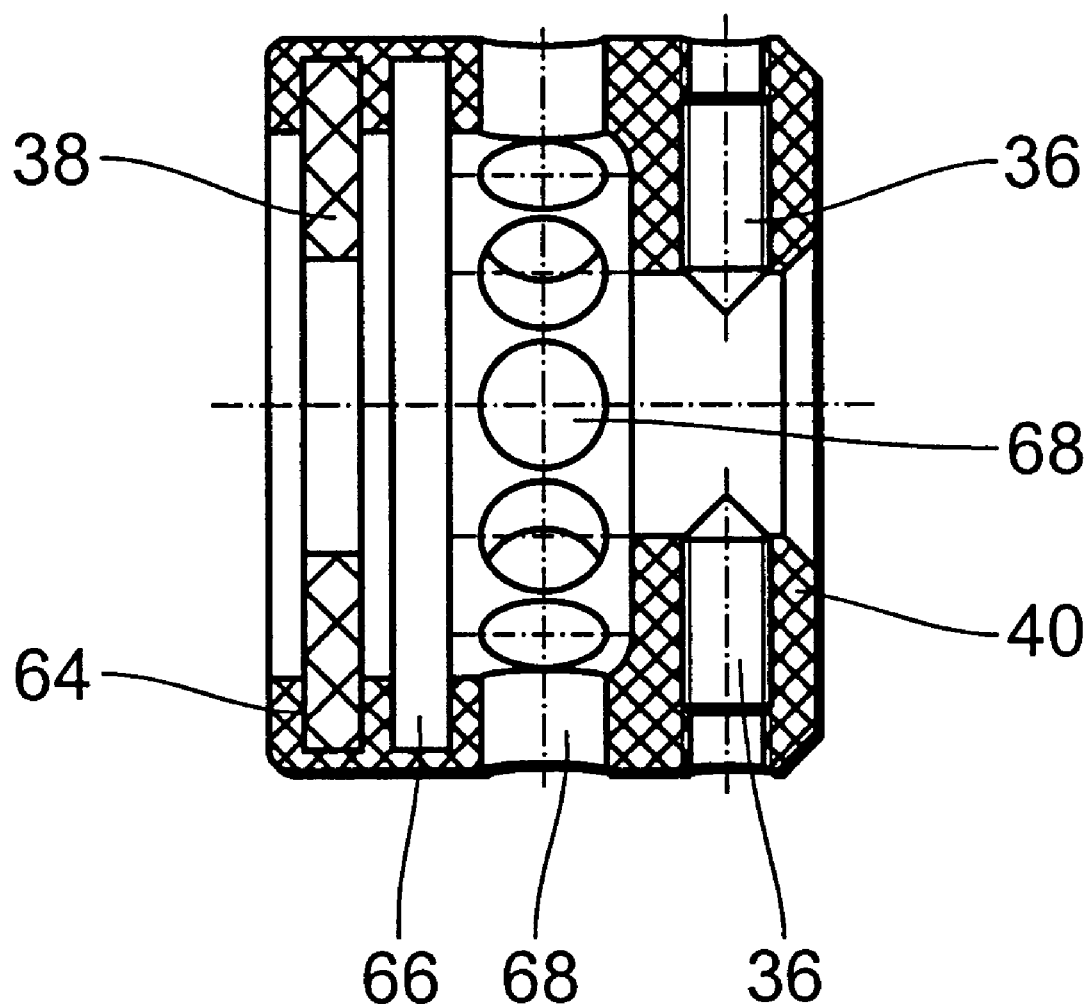

They show:

FIG. 1: a machine for filling sausage casings, with a device for filling casings according to the invention, in a side view;

FIG. 2: a device for filling casings according to the invention for a machine according to FIG. 1, in a plan view with partial sectional representation;

FIG. 3: the device for filling casings represented in FIGS. 1 and 2 with a casing take-along ring, in partial sectional representation, a casing having been pulled on;

FIG. 4: the representation in FIG. 3 without a pulled-on casing;

FIG. 5: an alternative implementation example of a casing brake for a device for filling casings according to the invention;

FIG. 6: a filling pipe 14 with two opposite grooves;

FIG. 7: an alternative implementation form of a device for filling casings, in a sectional representation;

FIG. 8: an alternative implementation example of a casing take-along apparatus;

FIG. 9: part of a casing take-along apparatus;

FIG. 10: an alternative implementation example of a device for filling casings, in a sectional representation;

FIG. 11: the casing take-along ring represented in FIG. 10, in an enlarged representation.

Shown in FIG. 1 is a machine 1 for filling sausage casings, with a device for filling casings according to the invention, which device is part of the filling machine 1. The filling machine 1 comprises a covered frame 4 for accommodating and securing a conveying device for conveying sausage meat from a storage container in the form of a filling funnel 6, a drive means, control and regulating equipment, as well as operating equipment for operating the filling machine 1. Sausage meat held in the filling funnel 6 is fed via the conveying device to the device for filling casings 2, by means of which the sausage casing 8 that is to be filled (see FIG. 3) can be filled with sausage meat and the filled casing can be twisted off, so that individual, portioned sausages are formed.

The device 2 for filling casings, represented in FIG. 2 in plan view, is part of the filling machine 1 represented in FIG. 1. The device 2 for filling casings is firmly joined to a twist-off drive 10 (see also FIG. 1) mounted on the frame 4 and has a straight filling pipe 14 that is rotatable around its longitudinal axis 12 and is driveable by means of a drive (not shown), onto which filling pipe can be pulled a casing 8 (cf. FIG. 3) that is fillable with sausage meat through the filling pipe 14. At its rear end 16, the filling pipe 14 is screwed or flanged to a hollow shaft 20 by means of a filling-pipe nut 18 and upon rotation of the hollow shaft 20 is put into rotation around the longitudinal axis 12 by means of the drive. At its open front end 22, the hollow filling pipe 14 shows a delivery or outlet opening for delivering the sausage meat flowing through the filling pipe 14. With the aid of the conveying device, sausage meat can be fed under pressure through the hollow shaft 20, the filling pipe 14, and the outlet opening 23 into a casing 8 to be filled (see FIG. 3), which casing is pulled partially onto the filling pipe 14. Over the filling pipe 14 the casing 8 is essentially in a gathered-up or caterpillar-like state. In the region of the front end 22 of the filling pipe 14 the casing 8 is pulled off.

The device 2 for filling casings shows further an essentially L-shaped holding frame 24 that is arranged on the frame 4 of the filling machine 1 so as to be swingable in the horizontal plane, at the free end of which holding frame a casing brake 26 with a brake ring 28 is arranged, by means of which the casing 8 is prevented from being rotated in the region of the open front end 22 of the filling pipe 14.

As is illustrated in FIGS. 2 through 4, coupled to the filling pipe 14 so as to be axially movable relative to the filling pipe 14 and in an essentially interlocking manner is a casing take-along apparatus 30, rotatable together with the filling pipe 14, for the purpose of rotating the casing 8. Through the interlocking connection of the casing take-along device to the filling pipe 14, upon a rotation of the filling pipe 14 a torque is transmitted via the interlocking connection to the casing take-along apparatus 30, so that the casing take-along apparatus 30 is rotated together with the filling pipe 14, while at the same time an axial movement of the casing take-along apparatus 30 along the filling pipe 14 is possible.

For producing the interlocking connection the filling pipe 14 shows on the exterior two opposite grooves 34, which extend from the rear region 16 up to the front region 22 of the filling pipe 14. The casing take-along apparatus formed as a casing take-along ring shows two opposite projections 32 that in each case are arranged inside a groove 34 and work together with the latter to provide an interlocking connection and an axial guide for the casing take-along apparatus 30. The projections 32 are formed on the front sections of fixing screws 36. The fixing screws 36 are designed as set screws that are screwed into threaded bores that are formed in the take-along apparatus 30. In a manner not shown, the set screws can be secured against unintentional loosening by the aid of counter screws.

FIG. 6 illustrates an example of a filling pipe 14 that is provided with grooves 34, which are arranged oppositely and extend in the axial direction of the filling pipe 14. The shape of the grooves 34 can be adapted to the shape of the projections 32. Thus, for example, U- or V-shaped grooves can be planned. Likewise, more than two grooves can be formed on the outside of the filling pipe 14, which grooves work together with a corresponding number of projections formed on the casing take-along apparatus 30.

The casing take-along apparatus 30 represented in FIGS. 2 through 4 shows a pressure means 38 that is designed as an elastically deformable clamp ring of plastic material. The take-along ring forming the casing take-along apparatus 30 shows an essentially radially-extending connecting section 40, which, for producing the interlocking connection to the filling pipe 14, shows threaded bores that receive the fixing screws 36; the take-along ring shows as well a fixing section extending essentially axial-concentrically to the filling pipe 14, which fixing section receives the clamp ring forming the pressure means 38. For taking up the clamp ring, a circular groove is formed on the fixing section 42.

FIG. 3 illustrates the clamp ring in the deformed state, as it works together with the casing 8 in a friction-locked manner. The connecting section 40 and the pressure means 38 are, as FIG. 3 shows, so distanced that between the two a segment of the gathered-up casing 8 is arranged. The pressure means 38 provides a fixing of the casing 8 to the casing take-along apparatus 30, so that a torque is transmitted by the casing take-along apparatus 30 to the casing 8 for rotating the latter.

The casing brake 26 with brake ring 28 for preventing the rotation of the casing 8 is formed in FIGS. 3 and 4 as a so-called inner brake, and in FIG. 5 as a so-called outer brake. In the implementation example represented in FIG. 5 an elastic ring 44 lies against the filling pipe 14 and clamps the casing to the filling pipe 14. By means of a nut 46 the brake ring 28 can be axially shifted and fixed in different positions, in order to be able to change the pressure of the casing 8 on the filling pipe 14. In FIGS. 3 and 4 on the left is a holding arrangement 48 for holding stationary the filled casing 8. It shows two pressure rollers 50, 52 whose distance from each other can be adjusted.

FIG. 7 illustrates in a sectional representation an alternative implementation example of a device 2 for filling casings, with a casing take-along apparatus 30 showing two projections 32 that work together with grooves 34 formed on the filling pipe 14. The projections 32 are formed on movable pegs 54 (cf. also FIG. 9) that are pressed into the grooves 34 by means of a spring 56. The pegs 54 and the springs 56 are arranged in each case against a fixing screw 36 in the manner of a set screw, which is screwed into threaded bores that are formed in the take-along apparatus 30 in the connecting sections 40.

The filling pipe 14 is rigidly joined to a pipe flange 58 that is coupled to a rotating drive (not represented). The grooves 34 extend from the front end 22 to the rear end 16 of the filling pipe 14. The pressure means 38 is likewise formed as an elastic ring and by means of screws 60 is fastened to the casing take-along apparatus 30 designed as a take-along ring.

The casing take-along apparatus 30 represented in FIG. 8 is distinguished from that represented in FIG. 7 merely by the fact that fixing screws 36 formed as set screws are designed with a pointed front section, which in each case forms the projection 32. The fixing screws 36 are screwed into threaded bores 62 formed in the connecting section 40 of the take-along ring.

In a manner not illustrated, provision can be made for an arrangement for ascertaining at least one position of the casing take-along apparatus 30 relative to the filling pipe 14, with whose aid the actual position of the casing take-along apparatus 30 or a specified position can be ascertained. The position-ascertainment arrangement is preferably designed as a contactlessly probing sensor or as a mechanical switch and provides a signal that is either a measurement for the actual position or a measurement for the one specified position. By means of the sensor, which in the case of the ascertainability of one specified position is arranged in the region of the front end 22 of the filling pipe 14, the drive propelling the filling pipe 14 can be turned off when the casing take-along apparatus 30 has reached the front end 22 of the filling pipe 14 and the casing 8 has been largely used up.

The alternative implementation example of a device for filling casings represented in FIGS. 10 and 11 shows structural commonalities and similarities to the implementation example represented in FIGS. 7 and 8, so that for functionally equivalent parts the same reference numerals have been used and to that extent reference is made to the above descriptions in order to avoid repetition.

The casing take-along apparatus 30 in the form of a take-along ring shows a first groove 64 that is formed on the inner side, facing the filling pipe 14, of the fixing section 42 of the take-along ring. An elastic pressure means 38 in the shape of a so-called casing-holding lip is arranged partially inside the groove 64 and is wedged into the latter and fastened to the fixing section 42.

An additional groove 66 is arranged in the fixing section 42 of the take-along ring so as to be axially distanced from the first groove 64 and in the manner just described serves to fasten a pressure element 38, for example in the form of a collagen casing. Thus, according to choice the first groove 64 and/or the second groove 66 can be used to fasten the pressure elements 38 to the take-along ring.

Several bores 68 are formed equidistantly in the essentially axially-extending fixing section 42 of the take-along ring. The bores 68 serve as viewing windows, so that a gathered-up casing arranged in the interior space of the take-along ring is visible to an operator from the outside and consequently perceivable to what extend the casing is already used up. In addition, a good cleansing by means of a rinsing fluid is possible through the bores 68.

The pipe flange 58 shows a groove for accommodating a sealing ring 70 with a sealing lip that provides a sealing with respect to a pipe segment (not represented) through which the sausage meat to be portioned is introduced into the filling pipe 14.

In a manner not represented, the casing take-along apparatus 30 formed as a take-along ring could be fabricated from a transparent or clear plastic material, so that the bores 68 can be omitted and yet the gathered-up casing is recognizable from the outside. As a transparent material polysulfone, for example, can be used.

What is claimed is:

1. Device for filling casings for a machine for filling sausage casings, with a filling pipe (14) that is rotatable and driveable around its longitudinal axis (12), onto which filling pipe a casing (8) fillable through the filling pipe (14) can be pulled, and with a casing take-along apparatus (30) that is rotatable simultaneously with the filling pipe (14) for rotating the casing (8), characterized hereby, that the casing take-along apparatus (30) is arranged so as to be axially movable relative to the filling pipe (14) and, for transmitting a torque, is coupled to the filling pipe (14) in an essentially interlocking manner.

2. Device for filling casings according to claim 1, characterized hereby, that the casing take-along apparatus (30) shows at least one projection (32) and the filling pipe shows on the outside at least one axially-running groove (34), in order to produce the interlocking and simultaneously axially-movable connection between the take-along ring and the filling pipe (14).

3. Device for filling casings according claim 1, characterized hereby, that the casing take-along device (30) is formed essentially as a casing take-along ring arranged coaxially to the filling pipe (14).

4. Device for filling casings according to claim 3, characterized hereby, that the take-along ring consists essentially of a plastic material.

5. Device for filling casings according to claim 3, characterized hereby, that at least one fixing screw (36) can be screwed into the take-along ring, the front section of which screw forms the projection and is arranged partially in the groove (34) formed on the filling pipe (14).

6. Device for filling casings according to claim 5, characterized hereby, that the fixing screw (36) is designed as a set screw.

7. Device for filling casings according to claim 5, characterized hereby, that the fixing screw (36) is secured against unintentional loosening by means of a counter screw.

8. Device for filling casings according to claim 1, characterized hereby, that the casing take-along apparatus (30) shows at least one pressure means (38) for the essentially friction-locked or interlocked fixing of the casing (8) to the casing take-along apparatus (30).

9. Device for filling casings according to claim 8, characterized hereby, that the pressure means (38) is designed as an elastically deformable clamp ring that is preferably attached to the take-along ring.

10. Device for filling casings according to claim 8, characterized hereby, that the take-along ring shows an essentially radially-extending connecting section (40) for producing the connection to the filling pipe (14) and an essentially axially-extending fixing section (42) for accommodating the pressure means (38) for the fixing of the casing (8).

11. Device for filling casings according to claim 10, characterized hereby, that in the essentially axially-extending fixing section (42), on the side facing the filling pipe (14) when in the assembled state, a groove (64) for accommodating the pressure means (38) is formed.

12. Device for filling casings according to claim 10, characterized hereby, that an additional groove (66) is formed on the inner side of the fixing section (42), which side faces the filling pipe (14).

13. Device for filling casings according to claim 10, characterized hereby, that the fixing section (42) shows at least one passage bore (68) as a viewing window.

14. Device for filling casings according to claim 1 characterized through a casing brake (26) arranged in the region of the open end of the filling pipe (14), for preventing the rotating of the casing (8) in this region.

15. Device for filling casings according to claim 14, characterized hereby, that the casing brake (26) shows a brake ring (28) that works together with the filling pipe (14).

16. Device for filling casings according to claim 15, characterized hereby, that the brake ring (28) shows an elastic lip section or a conical constricting section.

17. Device for filling casings, in particular according to claim 1 characterized through an arrangement for ascertaining at least one position of the casing take-along apparatus (30) relative to the filling pipe (14).

18. Device for filling casings according to claim 17, characterized hereby, that the position-ascertainment arrangement shows a non-contacting probing sensor that responds to the casing take-along apparatus (30).

19. Casing take-along apparatus according to claim 18, that the sensor is arranged fixedly in the region of the front end of the filling pipe (14), which end shows the outlet opening (23) for the sausage meat, and provides a signal with whose aid the drive for the filling pipe (14) can be shut off.

20. Machine for filling sausage casings, with a supply container for sausage meat, a conveying device connected to the supply container for conveying the sausage meat, and a device (2) for filling casings, which filling device shows a filling pipe (14) driveable and rotatable around its longitudinal axis (12), onto which pipe a casing (8) fillable through the filling pipe (14) is pulled, and a casing take-along apparatus (30) that is rotatable simultaneously with the filling pipe (14) for rotating the casing (8), characterized hereby, that the casing take-along apparatus (30) is arranged so as to be axially movable relative to the filling pipe (14) and, for transmitting a torque, is coupled to the filling pipe (14) in an essentially interlocking manner.

21. Machine according to claim 20, characterized hereby, that the casing take-along apparatus (30) is designed according to at least one of the foregoing claims 1 through 19.

\* \* \* \* \*